United States Patent [19]

Hirai et al.

[11] Patent Number: 4,716,593
[45] Date of Patent: Dec. 29, 1987

[54] IDENTITY VERIFICATION SYSTEM

[75] Inventors: Shoichi Hirai, Yokohama; Sadakazu Watanabe, Kawasaki, both of Japan

[73] Assignee: Tokyo Shibaura Denki Kabushiki Kaisha, Kawasaki, Japan

[21] Appl. No.: 505,496

[22] Filed: Jun. 17, 1983

[30] Foreign Application Priority Data

Jun. 25, 1982 [JP] Japan .................. 57-109527

[51] Int. Cl.$^4$ .............................................. G10L 5/00
[52] U.S. Cl. ........................................ 381/42; 381/43
[58] Field of Search ............... 382/2, 3, 4, 13, 36–38, 382/57, 34, 33; 340/825.34, 825.3; 381/41–50; 364/513, 513.5

[56] References Cited

U.S. PATENT DOCUMENTS

| | | | |
|---|---|---|---|
| 4,363,102 | 12/1982 | Holmgren et al. | 381/42 |
| 4,449,189 | 5/1984 | Feix et al. | 381/42 |
| 4,520,500 | 5/1985 | Mizuno et al. | 381/43 |
| 4,601,054 | 7/1986 | Watari et al. | 381/42 |

OTHER PUBLICATIONS

Digital Processing of Speech Signals, L. R. Rabiner, R. W. Schafer, Prentice-Hall, Inc., 1978, pp. 476–477.

Primary Examiner—E. S. Matt Kemeny
Attorney, Agent, or Firm—Oblon, Fisher, Spivak, McClelland, & Maier

[57] ABSTRACT

An input pattern of an individual requesting identity verification, such as a speech pattern, is compared with reference patterns of a plurality of categories in a category recognition unit to recognize the category of the input pattern. A differential pattern corresponding to a difference between the input pattern and the reference pattern of the same category as that of the input pattern is computed by a differential pattern computation unit. The differential pattern is verified, in a verification unit, against reference differential patterns registered in a verification data file to perform the identity verification. When the identity verification based on the differential pattern is difficult, a feature vector pattern distinctively representing a feature of the individual is extracted from the differential pattern. The feature vector pattern is verified, by the verification unit, against reference feature vector pattern data of the same category registered in the verification data file.

2 Claims, 4 Drawing Figures

IDENTITY VERIFICATION SYSTEM

BACKGROUND OF THE INVENTION

This invention relates to an identity verification system.

In banking or in security-controlling access to buildings, identity verification is of great significance. A typical example of an identity verification system currently used is a system using an ID card in banks. In this ID card system, an ID number input by ten keys is verified against a number previously registered. This system has been widely used because of a simple configuration for identity verification.

The ID card system, however, suffers from a problem that when the ID card is lost or the ID number is forgotten, verfication cannot be performed. If the ID number is known to a third party by some means, there is the possibility of a false verification, which in turn may lead to illicit use of the ID card.

In order to avoid such a problem, many attempts have been made to employ an identity verification system which utilizes, in place of the ID number, a unique feature pattern of an individual, such as speech, fingerprints or handwriting style. These attempts perform the verification on the basis of a perfect coincidence between the input pattern and the registered pattern, and feature-value decision. Thus, these approaches to identity verification attain an insufficient verification rate.

SUMMARY OF THE INVENTION

Accordingly, an object of the present invention is to provide an identity verification system, which can perform identity verification in a simple and reliable manner.

The verification system of this invention first determines the category of an input pattern, such as an individual's speech pattern. Then, a difference pattern is computed, which corresponds to a difference between the input pattern and a reference pattern of the same category. This difference pattern is compared with registered reference difference pattern data to verify the individual's identity.

When the identity verification based on the difference pattern is difficult, a feature vector pattern is further extracted from the computed difference pattern so that a more accurate identity verification is performed.

According to the present invention, since the difference pattern distinctively representing an individual's identifying feature is used, as described above, identity verification can be reliably performed.

DETAILED DESCRIPTION OF THE PREFERRED EMBODIMENT

Figure 1:
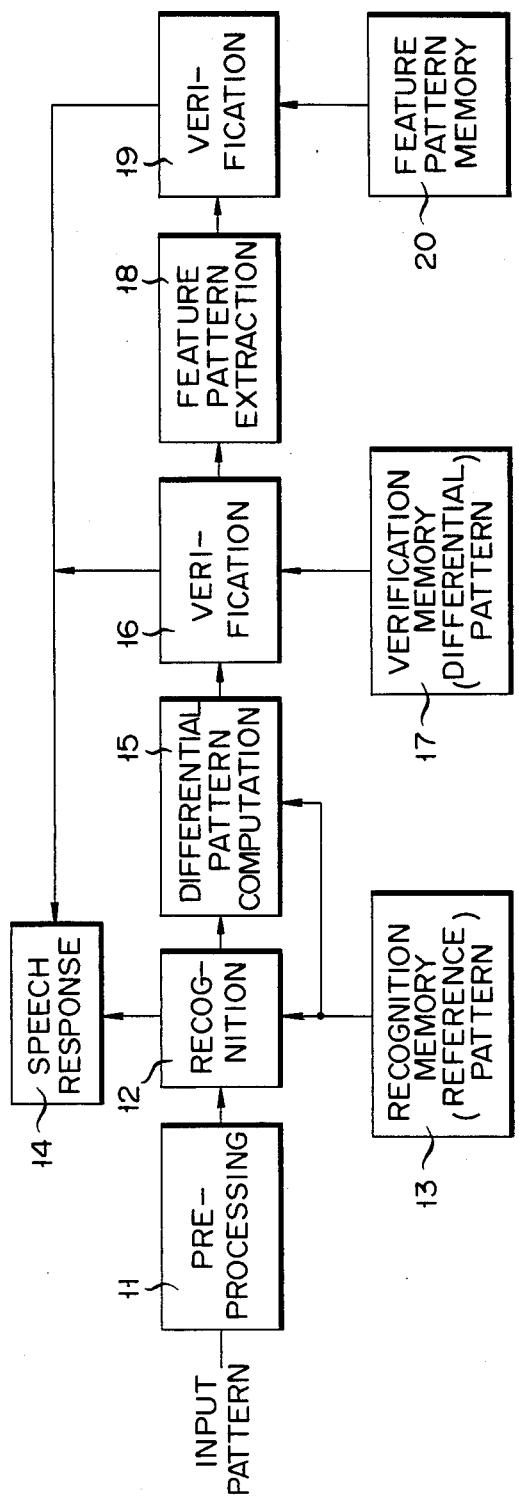
FIG. 1 shows in block form an identity verification system according to the present invention.

FIG. 1 illustrates an identity verification system of the present invention, in a block form according to a procedure of verification processing. The invention employs input information patterns for identity verification such as handwriting patterns and speech patterns. The verification processing procedure is composed of a category recognition processing of an input pattern and an identity verification processing. The recognition processing is executed by comparing the input pattern with reference patterns. The identity verification processing is composed of a first stage in which a difference pattern obtained by subtracting from the input pattern the reference pattern of the same catagory is verified against the previously registered reference difference patterns of registered persons of the same category as that of the input pattern, and a second stage for verifying a feature vector pattern extracted from the difference pattern against registered reference feature vector patterns of the same category. The processing of the second stage is performed only when the verification of the first stage is imperfect.

In FIG. 1, an input data pattern such as a handwriting pattern or a speech pattern is preprocessed by a preprocessing unit 11 into digital data suitable for the recognition process. The digital data is verified, by a recognition unit 12, against reference patterns of a plurality of categories registered in a recognition memory 13, wherein the category of the input pattern is recognized.

The result of the input pattern recognition is audibly indicated, by a speech response unit 14, to the individual seeking identity verification. If the recognition is rejected, as when the input pattern cannot be recognized, the speech response unit 14 requests the reentry of the input data. When the individual complies with the recognition result, the identity verification processing is then performed.

In the present invention, a difference pattern computation unit 15 computes a difference pattern which indicates distinctly the feature of the individual, and corresponds to a difference between the input pattern and the reference pattern of the same category as that of the input pattern. The reference difference pattern data of the registered persons are registered in a verification memory 17 for each category. An individual's difference pattern, which has been prepared by the difference pattern computation unit 15, is verified against the referece difference pattern data of the same category, in a verification unit 16. On the basis of the verification result of the difference pattern, the verification request by the individual is accepted or rejected. For example, when a similarity measure computed by the difference pattern computation unit 15 is above a first decision threshold, the verification request is accepted. On the other hand, when it is below a second decision threshold, the verification request is rejected. The result of the verification processing is reported to the individual requesting verification, through the speech response unit 14. When the similarity measure is between the first and second decision thresholds, i.e., the judgement of the verification is difficult, the verification processing of the second stage is performed.

In the verification processing of the second stage, a feature pattern extraction unit 18 extracts a feature vector pattern distinctly representing the feature of the individual from the difference pattern. The reference feature patterns extracted from the difference patterns of the registered persons are registered in a feature pattern memory 20. In a verification unit 19, a feature pattern extracted by the feature pattern extraction unit 18 is verified against the reference feature pattern data registered in the memory 20. The result of this verification is audibly reported to the individual by the speech response unit 14.

An embodiment of the invention for performing identity verification using a speech pattern will be described referring to FIG. 2. An identity verification system of FIG. 2 comprises a speech input processing unit 30, a verification data file 31, a data memory 32, a speech recognition unit 33, a speaker verification unit 34, a difference pattern computation unit 35, a feature pattern extraction unit 36, and a control unit (CPU) 37. These units are coupled to a direct memory access (DMA) bus 38. Further, a speech response unit 39 is connected to the CPU 37 through an I/O bus 40.

The speech input processing unit 30 comprises an amplifier, a lowpass filter, an analog-to-digital converter and an acoustic processing circuit. The speech input processing unit 30 processes a speech input, which is applied through a microphone 30a, of a person requesting identity verification, and forms a speech pattern suitable for speech recognition. The speech pattern data is temporarily stored in the data memory 32 and then adapted for speech recognition and identity verification. The speech input for speech recognition and identity verification is preferably an identification or key code number consisting of a plurality of digits each representing a category, which is set by each individual.

The speech response unit 39 comprises a control circuit, a speech memory, an interface for coupling the control circuit to the I/O bus 40, a digital-to-analog (D/A) converter, a lowpass filter coupled to the output of the D/A converter, and an amplifier. Under the control of the CPU 37, word data are sequentially read out of the speech memory to form sentences required for the identity verification process, which are audibly indicated through a loudspeaker 39a.

The speech recognition (category recognition) unit 33 comprises a similarity computation unit 33a and a reference pattern memory 33b. The reference pattern memory 33b stores reference speech pattern data for every category. In the case of numerical data such as an identification number, ten categories from "0" to "9" are involved. The speech recognition unit 33 recognizes the category of the speech input by computing a similarity between the speech input pattern from the speech input processing unit 30 and the reference pattern data stored in the memory 33b.

Assume that the speech pattern used for identity verification is expressed by a vector $f^{(l)}$ where l indicates a category (l=1, 2, 3, ..., L) of the speech pattern. For example, the reference pattern of the category l may be formed by averaging patterns of the category l obtained from an indefinite number of persons, or using a set of the patterns, $\{f_j^{(l)}\}$. That is, the reference pattern $\psi^{(l)}$ is given by $$\{f_j^{(l)}\}(j=1, 2, 3, \ldots, Jl) \rightarrow \psi^{(l)}$$

The reference pattern is registered for every category in the reference pattern memory 33b. Similar to a reference pattern in the known multiple similarity method or compound similarity method, the reference pattern $\psi^{(l)}$ is given by $$\psi^{(l)} = \{\phi_m^{(l)}\}(m=1, 2, 3, \ldots Ml)$$

In the above relation, $\phi_1^{(l)}, \phi_2^{(l)}, \phi_3^{(l)} \ldots$ are orthogonal to one another.

The verification data file 31 is, for example, a large-capacity memory such as a magnetic drum or a magnetic disk. The verification data file 31 contains individuals' identification numbers, the reference speech difference pattern data of each digit of an identification number set by an individual, and reference feature vector pattern data extracted from the speech difference pattern.

Assume that a pattern used for filing a specific feature of an individual $\alpha$ for identity verification is $g_\alpha^{(l)}$. The pattern $g_\alpha^{(l)}$ belongs to the category l and represents a feature of the individual $\alpha$. By subtracting the mean pattern of the same category l, i.e., the reference pattern, from the pattern $g_\alpha^{(l)}$, the speech difference pattern $h_\alpha^{(l)}$ distinctively indicating the feature of the individual is obtained as follows:

$$h_\alpha^{(l)} = \frac{g_\alpha^{(l)} - \sum_{m=1}^{Ml} (g_\alpha^{(l)} \cdot \phi_m^{(l)})\phi_m^{(l)}}{\| g_\alpha^{(l)} - \sum_{m=1}^{Ml} (g_\alpha^{(l)} \cdot \phi_m^{(l)})\phi_m^{(l)} \|}$$

Where (.) indicates an inner product, and $\| \; \|$ indicates a norm and is used for the normalization. The difference pattern $h_\alpha^{(l)}$ may be simply obtained with a denominator of "1". The difference pattern $h_\alpha^{(l)}$ thus obtained is registered in the verification data file 31 as the reference difference pattern data for the identity verification. Alternatively, a dictionary of the multiple similarity method may be prepared using a set of difference patterns $h_\alpha^{(l)}$ to be registered in the verification data file 31.

In the identify verification system of the invention a feature vector pattern is further extracted from the difference pattern $h_\alpha^{(l)}$. Namely, when the input pattern is a speech pattern, phonematic features of consonants and vowels are extracted. From the analysis of the phonematic features, the feature vector pattern is obtained as follows:

$$C_\alpha^{(l)} = \left\{ C_{\alpha(1)}^{(l)}, C_{\alpha(2)}^{(l)}, \ldots, C_{\alpha(n)}^{(l)} \right\}$$

This features vector pattern $C_\alpha^{(l)}$ is registered in the verification data file 31, as the reference feature pattern data for the identity verification.

The difference pattern computation unit 35 computes a speech difference pattern corresponding to a difference between the input speech pattern and the reference pattern data, stored in the reference pattern memory 33b, of the same category as that of the input speech pattern, and it is temporarily stored in the data memory 32.

The speech difference pattern for the verification is computed in the following manner. Assume that an input pattern of an individual is p. The category of the input pattern p is decided by recognition unit 33. Using the reference pattern component $\phi_m^{(p)}$ of the same category, the differential pattern $q^{(p)}$ of the input pattern p is computed as follows:

$$q^{(p)} = \frac{p - \sum_{m=1}^{Ml} (p \cdot \phi_m^{(p)})\phi_m^{(p)}}{\| p - \sum_{m=1}^{Ml} (p \cdot \phi_m^{(p)})\phi_m^{(p)} \|}$$

The feature pattern extraction unit 36 extracts from the speech difference pattern a feature vector pattern like the phonematic feature vector as mentioned above. The feature vector pattern is temporarily stored in the data memory 32 for identity verification in the second stage. In this case, the feature vector pattern $d_\alpha$ can be obtained, in a known manner, as follows:

$$d_\alpha = \{d_{\alpha(1)}, d_{\alpha(2)} \sim d_{\alpha(n)}\}$$

The speaker verification unit 34 verifies the speech difference pattern $q^{(l)}$ and the feature vector pattern $d_\alpha$ obtained from the input speech pattern whose category has been recognized, against the reference difference pattern $h_\alpha^{(l)}$ and the reference feature pattern data $C_\alpha^{(l)}$ of the same person registered in the verification data file 31.

The verification processing in the first stage using the speech difference pattern is performed by a known method, for example, a simple similarity method or a multiple similarity method. For example, when the simple similarity method is used, the similarity $S(q^{(l)}, h_\alpha^{(l)})$ beween $q^{(l)}$ and $h_\alpha^{(l)}$ is calculated as follows:

$$S(q^{(l)}, h_\alpha^{(l)}) = \frac{(q^{(l)} \cdot h_\alpha^{(l)})}{||q^{(l)}|| \, ||h_\alpha^{(l)}||}$$

Assume now that decision thresholds are $\theta 1$ and $\theta 2$ ($< \theta 1$). Under the condition $S(q^{(l)}, h^{(l)}) > \theta 1$, it is judged that the individual requesting verification is the registered individual $\alpha$, and the verification request is accepted. Under the condition, $$S(q^{(l)}, h^{(l)}) < \theta 2$$

it is judged that the individual requesting verification is not the registered individual, and the verification request is rejected. When $\theta 2 < S(q^{(l)}, h^{(l)}) < \theta 1$, it is difficult to determine whether or not the individual requesting verification is the individual $\alpha$. Accordingly, in this case, the verification processing of the second stage is executed on the basis of the feature vector pattern.

When the threshold $\theta 2$ is set to 0, the verification system may be arranged to perform the second stage verification processing whenever the verification request is not accepted.

Where a plurality of registered individuals of the same category are involved, the similarities are calculated for every individual. With the maximum similarity denoted as Smax and a similarity ranked next to the maximum similarity as Snext, the following decision processing is executed. The decision thresholds are denoted as $\theta 3$, $\theta 4$ and $\theta 5$. When the following conditions are both satisfied $$Smax = Max\{S(q^{(l)}, h_\alpha^{(l)})|_\alpha\} > \theta 3$$

and $$Smax - Snext > \theta 4$$

it is decided that the invididual requesting verification is the individual $\alpha$. When Smax $< \theta 5$, the individual requesting verification is not registered and the verification request is rejected. When the above conditions are not met, the second stage verification processing using the feature vector pattern is then executed.

In the second stage verification processing, the feature vector pattern $d_\alpha^{(l)}$ extracted from the input pattern p in the feature pattern extraction unit 36 is compared with the reference feature pattern data $C_\alpha^{(l)}$ registered in the verification data file.

In this case, the verification is performed using a known transition table method or a known dynamic programming (DP) method. The degree of coincidence (distance) $T(C_\alpha^{(l)}, d_\alpha^{(l)})$ between $C_\alpha^{(l)}$ and $d_\alpha^{(l)}$ is calculated as follows:

$$T(C_\alpha^{(l)}, d_\alpha^{(l)}) = \min_F \frac{\sum_{i=1}^{n} t(C,d)\omega(i)}{\sum_{i=1}^{n} \omega(i)}$$

where $t_{(C, d)}$ is a distance between the feature vectors, $$C_{\alpha(i)}^{(l)} \text{ and } d_{\alpha(i)}^{(l)},$$

$\omega(i)$ is a weighting function, and $\min_F$ is a minimum value of $$\sum_{i=1}^{n} t(C,d)\omega(i) / \sum_{i=1}^{n} \omega(i)$$

in a range F.

When the decision thresholds are $\theta 6$ and $\theta 7$ ($> \theta 6$), if $T(C_\alpha^{(l)}, d_\alpha^{(l)}) < \theta 6$, the individual requesting verification is decided to be the registered individual $\alpha$. If $T(C_\alpha^{(l)}, d_\alpha^{(l)}) > \theta 7$, the individual requesting verification is not the registered individual $\alpha$. If $\theta 6 < T(C_\alpha^{(l)}, d_\alpha^{(l)}) < \theta 7$, it is decided that identity verfication is impossible, and the verification request is rejected.

When a plurality of registered persons are contained in the same category as that of the individual requesting verification, the distances of the feature pattern $d_\alpha^{(l)}$ of the individual requesting verification from the reference feature patterns $C_\alpha^{(l)}$ of the registered person are measured. In this case, a minimum distance is denoted as Tmin, and the distance next to the minimum one as Tnex. The decision thresholds are defined as $\theta 8$, $\theta 9$ and $\theta 10$, respectively. When the following conditions are met $$Tmin < \theta 8$$

and $$|Tmin - Tnext| > \theta 9$$

it is decided that the individual requesting verification is the registered individual $\alpha$. If Tmin $> \theta 10$, it is decided that the individual is not registered. Under conditions other than the above, it is decided that the verification is impossible, and the verification request is rejected.

The CPU 37 performs overall control of the transmission and reception of data among the units and the data processing. The identity verification system shown in FIG. 2 can be operated in a way similar to that of the system disclosed in U.S. patent application Ser. No. 460,379 filed Jan. 24, 1983, entitled "INDIVIDUAL VERIFICATION APPARATUS", and assigned to the same assignee as the present application.

The operation of the identity verification system of FIG. 2 will now be described referring to a flow chart of FIG. 3. A person requesting verification first starts the system. The person is urged by the speech response unit 39 to say his identification number in step S1. The input speech pattern is stored in the data memory 32 and is then sent to the similarity computation unit 33a. As a result, in step S2, the category of the input speech pattern is recognized. In step S3, it is decided whether recognition is possible or not. If it is not possible, in step S4, the speech response unit 39 urges the person requesting verification to say his number again. The above operation up to this point is repeatedly performed for each of the digits of the identification number. Upon completion of the category recognition, the person is required, through the speech response unit 39, of this confirmation of the identification number recognized by the system. When the confirmation is given by the person through the speech input processing unit 30, the operation of the identity verification system advances to the verification processing. In step S5, the speech difference pattern is computed by the difference pattern computation unit 35, and stored in the data memory 32.

In step S6, the difference pattern stored in the data memory 32 is verified against the reference difference pattern data of the same category registered in the verification data file 31. In step S7, the result of the verification is judged. Regardless of whether the verification request is accepted or rejected, when judgement is possible, the operation of the system further advances to step S10 in which the result of the judgement is audibly reported to the person requesting verification through the speech response unit 39.

As described above, when the judgement in step S7 is difficult, the identity verification processing of the second stage is performed. In step S8, the feature pattern extraction unit 36 extracts the feature vector pattern from the difference pattern. In step S9, the extracted feature pattern is verified against the reference feature pattern data in the verification data file 31. The result of the verification is audibly reported to the person by the speech response unit 39. This identity verification processing is performed for each digit of the identification number.

Figure 2:
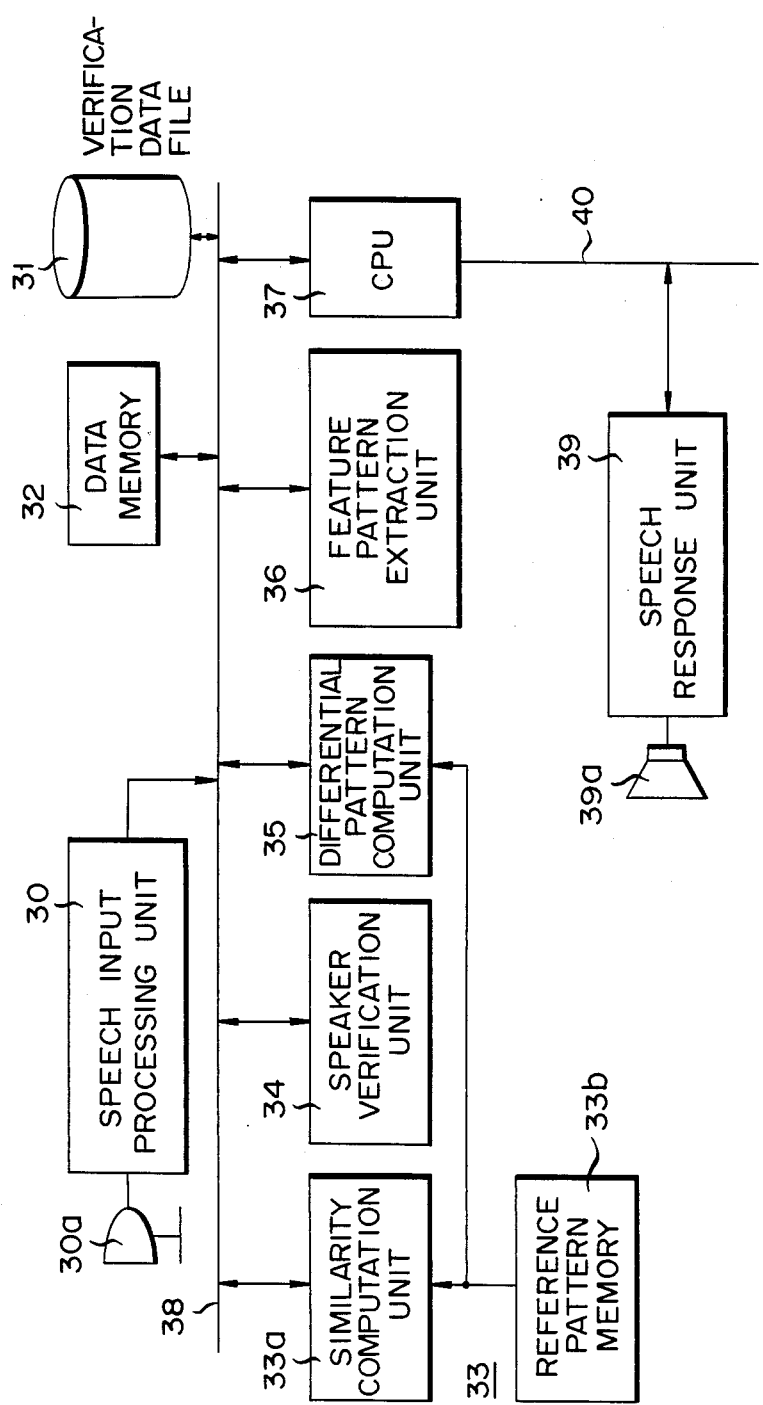
FIG. 2 shows a practical arrangement of an identity verification system utilizing a speech pattern.
Figure 3:
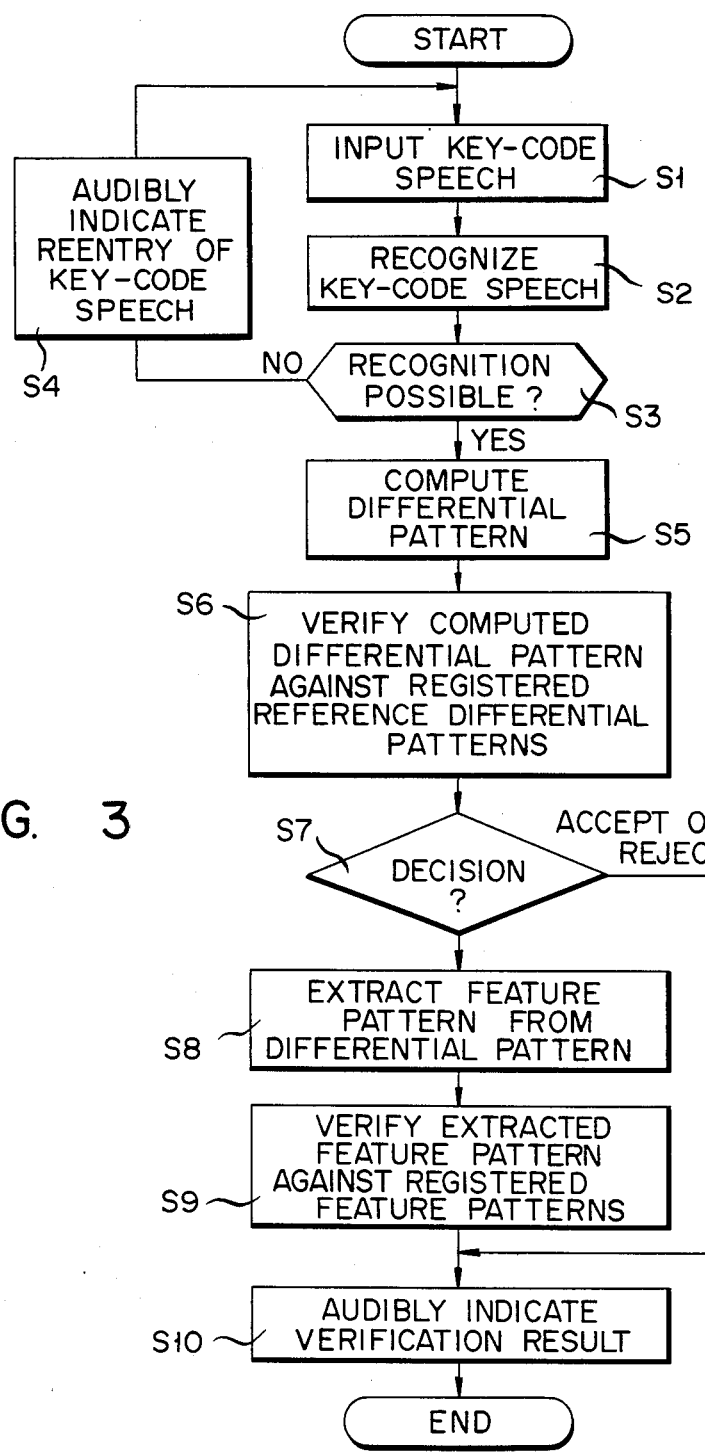
FIG. 3 shows a flow chart useful in explaining the operation of an identity verification process.
Figure 4:
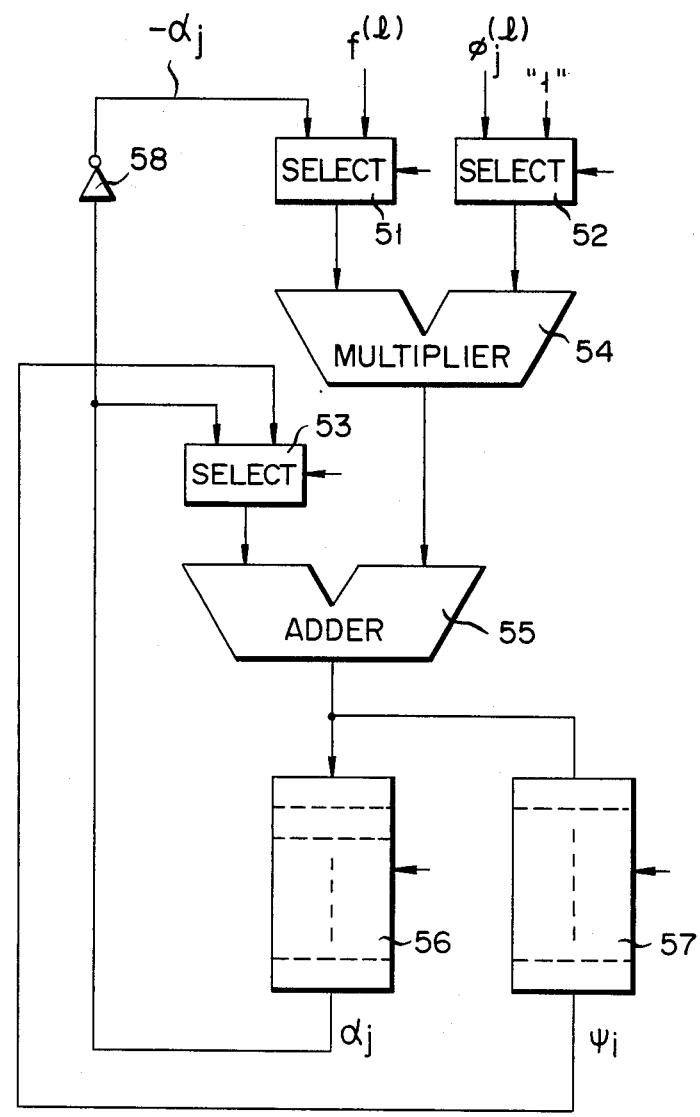
FIG. 4 shows an arrangement of a differential pattern computation unit of FIG. 2.

FIG. 4 illustrates a schematic arrangement of the difference pattern computation unit 35 of FIG. 2. The difference pattern computation unit 35 comprises selectors 51, 52 and 53, a multiplier 54, an adder 55, memories 56 and 57, and an inverter 58, and is arranged to compute the difference pattern in accordance with the above formula for the difference pattern computation on the condition that the denominator has a value of unity.

The input pattern $f^{(l)}$ and the reference pattern $\phi_j^{(l)}$ are respectively applied to the inputs of selectors 51 and 52, which have outputs coupled to inputs of multiplier 54. A logic level "1" signal is coupled to the other input of selector 52. An output $\alpha j$ of memory 56 having its input coupled to the output of adder 55 is coupled to the other input of selector 51 through inverter 58. The output of multiplier 54 is coupled to one of the inputs of adder 55. The output of selector 53 having inputs coupled to the outputs of memories 56 and 57 is coupled to the other input of adder 55.

With such an arrangement, when selectors 51 and 52 are enabled to select $f^{(l)}$ and "1", respectively, and memories 56 and 57 are disabled and enabled, respectively, $f^{(l)}$ is written into memory 57. When selectors 51, 52 and 53 are enabled to select $f^{(l)}$, $\phi_j^{(l)}$ and $\alpha j$, respectively, and memories 56 and 57 are enabled and disabled, respectively, $\alpha j = (f^{(l)} \cdot \phi_j^{(l)})$ is stored in memory 56. When selectors 51, 52 and 53 are enabled to select $-\alpha j$, $\phi_j^{(l)}$ and $\psi_i$, and memory 57 is enabled, $\psi^{(l)} = f^{(l)} - \Sigma_j (\phi_j^{(l)} \cdot f^{(l)}) \phi_j^{(l)}$ representing the difference is input to memory 57. The memories 56 and 57 each have j and i stages, respectively.

What we claim is:

1. An identity verification system comprising:
   speech input means for providing input speech pattern data from utterances of a speaker:
   first memory means for storing speech reference pattern data for each of categories prepared from speech pattern data obtained by utterances of a plurality of speakers;
   similarity computing means responsive to said speech input means and said first memory means for computing similarities between said input speech pattern data and said reference pattern data for each of categories and recognizing the category of utterance of the speaker from the computed similarities;
   second memory means for storing speech reference differential pattern data and reference vector pattern data of each of specific speakers for categories, said speech reference differential pattern data of a speaker being prepared by a difference between an input speech pattern of the speaker for a category and speech reference pattern data of the same speaker for the same category as the input speech pattern the speech reference feature vector pattern data being extracted from the speech reference differential pattern data for each of the specific speakers;
   speech differential pattern computing means responsive to said speech input means and said first memory for computing differential pattern data indicative of a difference between speech input pattern data obtained through said speech input means by a speaker claiming identify verification and speech refernce pattern data of the same category as the input speech pattern whose category has been recognized by said similarity computing means;
   identity verification means responsive to said second memory means and said speech differential pattern computing means for comparing the speech differential pattern data provided by said speech differential pattern computing means with the speech reference differential pattern data of the recognized category stored in said second memory means to verify the speaker claiming identity verification; and
   feature vector pattern extracting means responsive to said speech differential pattern computing means for extracting feature vector pattern data from the speech differential pattern data of the speaker claiming identity verification computed by said speech differential pattern computing means; and wherein
   said identity verification means is arranged to perform speaker identity verification, in a first stage, on the basis of the speech differential pattern data, and, in a second stage, on the basis of the feature vector pattern data when the first stage identity verification is difficult.

2. The system according to claim 1, wherein said speech differential pattern data $h_\alpha(l)$ of a speaker $\alpha$ for a category l as follows:

$$h_\alpha^{(l)} = \frac{g_\alpha^{(l)} - \sum_{m=1}^{Ml} (g_\alpha^{(l)} \cdot \phi_m^{(l)}) \phi_m^{(l)}}{\| g_\alpha^{(l)} - \sum_{m=1}^{Ml} (g_\alpha^{(l)} \cdot \phi_m^{(l)}) \phi_m^{(l)} \|}$$

where $g_\alpha^{(l)}$ is an input speech pattern of the speaker $\alpha$ for the category l, $\phi_m^{(l)}$ is a speech reference pattern, Ml is the number of speech reference patterns for category l, (.) indicates an inner product, and $\|\ \|$ indicates a norm.

* * * * *